March 26, 1957     R. H. FELDMEIER     2,786,696
VISIBLE SEAL SANITARY COUPLING FOR METAL TUBING
Filed June 21, 1954
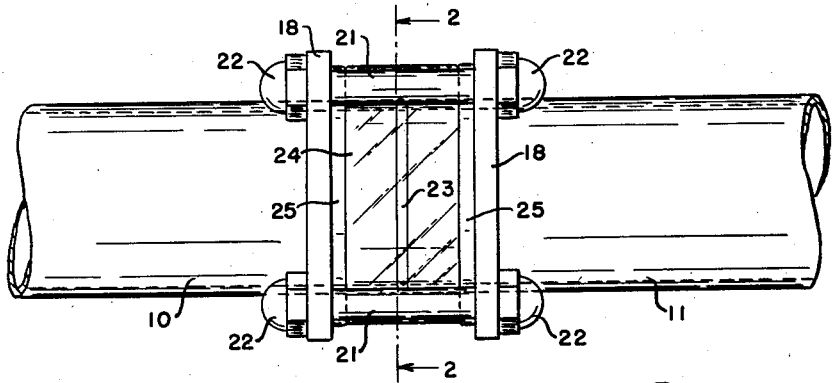
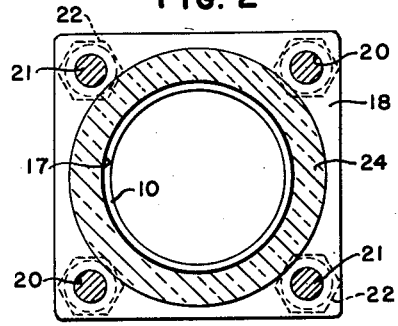
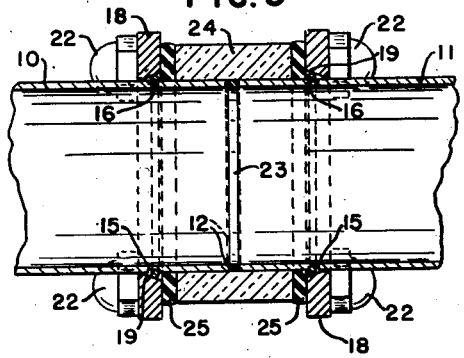
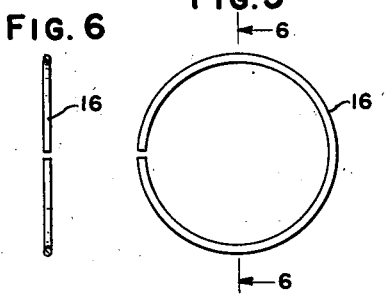
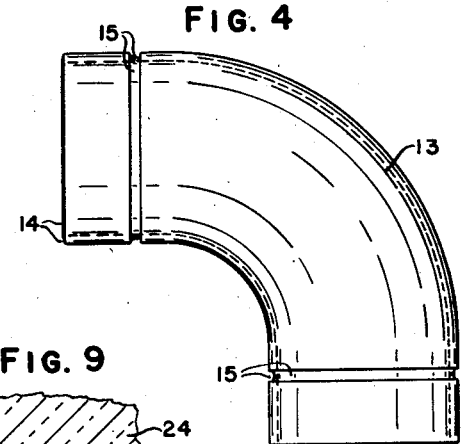
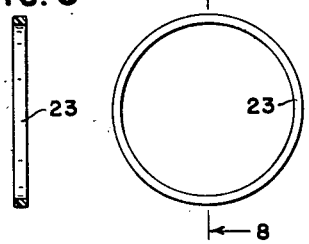
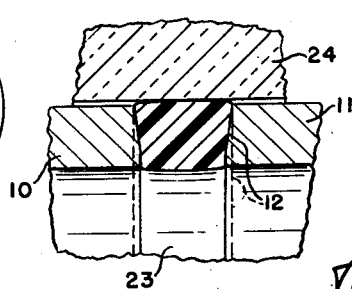
ROBERT H. FELDMEIER
INVENTOR
BY Theodore E. Simonton
ATTORNEY

United States Patent Office 2,786,696
Patented Mar. 26, 1957

2,786,696

VISIBLE SEAL SANITARY COUPLING FOR METAL TUBING

Robert H. Feldmeier, East Syracuse, N. Y., assignor to Sanitary Processing Equipment Corporation, Woodside, N. Y., a corporation of New York Application June 21, 1954, Serial No. 438,098

4 Claims. (Cl. 285—13)

This invention relates to a coupling means for metal tubing and more particularly to a coupling means for unthreaded tubes embodying a butt-seal between tube sections, which is visible at all times for inspection.

The present invention is particularly adapted for joining sections of stainless steel tubing used in processing milk and milk products. Stainless steel is substantially unaffected by the constituents of milk and milk products and, when properly constructed, installations of stainless steel tubing can be used for handling and treating milk and milk products, and can be cleaned "in place" without disassembling any joints, by pumping a cleaning solution through the system. For such "in place" cleaning, the sections of tubing must be coupled together and to the various elbows, T's and other fittings with a sanitary or sealed joint, leaving no pockets or traps in which milk or cleaning fluid can collect and deteriorate. Furthermore, milk treating plants are subject to strict state inspection and all joints are required to be inspected periodically to insure that no seal has leaked. It is, therefore, highly desirable in such sealed joints that the seal be visible at all times without disassembling the coupling.

In installations of this character it is frequently advantageous to use a coupling having detachable flanges. Tubing with detachable flanges may, in many instances, be installed with greater ease, and installations with such detachable flange couplings may be more readily disassembled for thorough cleaning and inspection and replacement of parts.

The principal object of the present invention, therefore, is to provide a sanitary coupling means for stainless steel tubing having no pockets or traps and adapted for "in place" cleaning.

Another object is to provide such a coupling means having a sealed joint which is at all times visible for inspection.

A further object of the invention is to provide such a coupling having detachable flanges.

Still further objects and advantages will be evident upon reading the following specification taken in connection with the drawing, in which:

Figure 1 is a side elevation of the preferred embodiment of the invention;

Figure 2 is a sectional view thereof on the line 2—2 of Figure 1;

Figure 3 is a longitudinal mid-section of the coupling of Figure 1;

Figure 4 is a section of tubing in the form of a 90-degree elbow adapted for use in the coupling of Figure 1;

Figure 5 is a plan view of the split locking ring of the coupling;

Figure 6 is a sectional view on the line 6—6 of Figure 5;

Figure 7 is a plan view of the sealing member of the coupling;

Figure 8 is a sectional view on the line 8—8 of Figure 7; and

Figure 9 is a greatly enlarged fragmentary view of a portion of the coupling shown in Figure 3.

In the drawing, in Figure 1, two sections of steel tubing 10 and 11 are shown coupled. The inner portions of the tube ends are squared and the outer portions beveled as shown in Figure 3 and more clearly in Figure 9. This outward bevel is of the order of 8 degrees, and, in Figure 9, is plainly shown to include a substantial portion, but not all, of the tube wall thickness. In Figure 4, the ends of the 90-degree elbow section 13, there shown, are similarly beveled at 14.

Each tube section 10, 11 and 13 has an annular groove 15 therearound adjacent the end of the tube. In the coupling, as shown in Figure 3, a split ring 16 of spring wire lies in each groove 15. The diameter of the wire of the split ring 16 is slightly smaller than the wall thickness of the tubing and grooves 15 have a depth of substantially half the diameter of the wire. The width of the grooves 15 is slightly in excess of the diameter of the wire.

Each tube 10 and 11 projects through the central hole 17 in a flange plate 18, and the flange plate closely surrounds the tube. The annular edge of plate 18, around the central hole 17 and around the tube, is provided with a bevel surface 19 in contact with the split ring 16. This bevel is of the order of 20 degrees and extends across the major portion, but not all, of the annular edge of plate 18 around tube section 10 or 11.

Each flange plate 18 is also provided with a hole 20 (Figure 2) in each of the four corners of the plate through which threaded rod connecting members such as the studs 21 may pass. The threaded rods or studs 21 cooperate with the cap nuts 22 to draw the plates 18 together.

An annular sealing member 23, shown in Figures 7 and 8, substantially rectangular in cross-section and having outside and inside diameters substantially those of the tube sections 10 and 11, is provided between the ends of the tube sections. The sealing member 23 is of resilient material, such as "Teflon," capable of compression between the beveled edges of the tubing, so as to conform to the shape of the end edges of the tube sections as shown in Figure 9, but sufficiently rigid so as not to be displaced when assembling the coupling.

A tubular sleeve 24 of transparent material, such as heat resistant polystyrene, closely surrounds the ends of the tubular sections 10 and 11, between the flange plates 18—18. The transparent sleeve 24 serves as an aligning sleeve for the ends of the tube sections 10 and 11, and also as a backing member for the sealing member 23. As the tube sections 10 and 11 are drawn together, the sealing member 23 is compressed between the beveled edges 12 of the ends of the tube sections and is forced slightly outward into contact with the sleeve 24. Sleeve 24 being transparent, the joint between the tube sections 10 and 11 is, of course, entirely visible.

Two annular gaskets 25, of "Buna N" synthetic rubber, or other highly resilient material, are provided between the flange plates 18 and the sleeve 24. The gaskets 25 fit closely about the tube sections 10 and 11, and, when compressed between flange plates 18 and sleeve 24, effectively seal the ends of sleeve 24 with the tube sections 10 and 11, so that liquids and other extraneous material cannot penetrate under the sleeve 24 and interfere with the effectiveness of the visual inspection of sealing member 23.

The operation of the coupling means will be apparent from the above description. As the flange plates 18 are drawn toward one another by tightening nuts 22 on the studs 21, the beveled annular edge 19 of each flange plate 18 is drawn against the split ring 16 in groove 15. The beveled edge 19 forces the ring 16 firmly in the groove 15 and secures the flange plates 18 to the respective tube sections 10 and 11 so that the sections are likewise urged toward one another and clamp the sealing member 23 between their beveled edges 12.

The end wall of each tube section being beveled outwardly at 12, the sealing member 23 is squeezed thereby outwardly into contact with the sleeve 24 and the portion compressed most tightly is the inner portion adjacent the passageway through the tube sections. The joint between tube sections 10 and 11 is therefore most securely sealed along the portion adjacent the passageway which carries the fluid milk or milk product. This butt seal between the ends of the tube sections and backed up by the sleeve 24 has been found adequate for all purposes in the handling of milk and milk products where pressures are comparatively low. The sealing member 23 fills the gap between the tube ends and is under highest compression adjacent the milk passage so that no trap or pocket is left for the lodgement of milk particles which may deteriorate if left standing.

The sleeve 24 being transparent, any insufficiently secured, or defective, seal will be readily detectable since any fluid leaking by the sealing member 23 will be observed under the transparent sleeve 24. Visibility through the transparent sleeve 24 is enhanced by the type of clamping device used to draw the flange plates 18 together. Studs 21 are of comparatively small diameter and offer the minimum of interference with visual inspection of the seal. The gaskets 25, of course, merely prevent water or other extraneous matter from entering under sleeve 24 from the outside, which might interfere with the detection of a leak past the sealing member 23.

It will be apparent that a straight section of tubing such as section 10 or 11 may be coupled in a similar manner to the 90-degree elbow 13, shown in Figure 4, and other fittings such as T's, reducers, crosses, caps and other elbows may be supplied which are equally adapted for use with the coupling means herein described. Other constructions, arrangements of parts, details and features, may be comprehended in the invention, and I desire to be limited, therefore, only by the scope of the appended claims.

I claim:

1. A visible seal coupling for joining sections of metal tubing having a butt joint, said coupling being suitable for use in dairy product processing and like installations requiring periodic inspections for tightness and cleanliness, comprising a pair of metal tube sections each having an end adapted for butt-sealed engagement with the other section, an annular sealing member of resilient material having outside and inside diameters substantially equal to those of said tube sections for engagement with said tube ends, flange members detachably engaging each tube section adjacent and spaced from its said end, threaded rod and nut connecting members adapted to draw said flange members and thereby said tube sections toward one another, whereby said sealing member is compressed between said tube ends, and a sleeve of transparent material closely fitting around said tube sections between said flanges, whereby said sealing member is visible for inspection without disassembly of the coupling.

2. A visible seal coupling, as claimed in claim 1, having annular gaskets of resilient material closely fitting around said tubes between said sleeve and said flanges for preventing extraneous matter from entering under said sleeve.

3. A visible seal coupling for joining sections of metal tubing having a butt joint, said coupling being suitable for use in dairy product processing and like installations requiring periodic inspections for tightness and cleanliness, comprising, in combination, a pair of metal tube sections each having an outwardly beveled end and each having an annular groove therearound spaced from said beveled end, an annular sealing member of resilient material having outside and inside diameters substantially equal to those of said tube sections for engagement with said tube ends, detachable clamping means including split metal rings for engagement with said grooves, for drawing said tube sections toward one another, and a sleeve of transparent material closely fitting around said tube sections and sealing member between said grooves, whereby said sealing member is compressed between said beveled tube ends without traps or pockets and is backed up and held in place by said sleeve and is visible for inspection without disassembly of the coupling.

4. A visible seal coupling for joining sections of metal tubing having a butt joint, said coupling being suitable for use in dairy product processing and like installations requiring periodic inspections for tightness and cleanliness, comprising a pair of metal tube sections each having an end adapted for butt-sealed engagement with the other, an annular sealing member of resilient material having outside and inside diameters substantially equal to those of said tube sections for engagement with said tube ends, clamping means for drawing said tube ends toward one another, securing means for detachably securing said clamping means to said tube sections at a point spaced from said tube end, and a sleeve of transparent material closely fitting around said tube sections between said securing means, whereby said tube section ends and said sealing member are held in engagement and are visible for inspection without disassembly of the coupling.

References Cited in the file of this patent

UNITED STATES PATENTS

| 1,295,263 | Blom | Feb. 25, 1919 |
| 1,821,867 | Wilson | Sept. 1, 1931 |
| 2,081,040 | King | May 18, 1937 |
| 2,359,239 | Newton | Sept. 26, 1944 |
| 2,388,432 | Nelson | Nov. 6, 1945 |

FOREIGN PATENTS

| 98,593 | Austria | Nov. 25, 1924 |